United States Patent [19]
White

[11] Patent Number: 4,942,990
[45] Date of Patent: Jul. 24, 1990

[54] CONTRACTORS' CADDY

[76] Inventor: Wood G. White, 18605 Center St., Castro Valley, Calif. 94546

[21] Appl. No.: 56,960

[22] Filed: Jun. 1, 1987

[51] Int. Cl.$^5$ ............................................. B60R 7/00
[52] U.S. Cl. ................................. 224/42.42; 224/273; 224/901; 248/310; 248/316.7; 220/85 H
[58] Field of Search ..................... 224/148, 273, 42.42, 224/42.43, 42.45 R, 311, 901; 296/37.1, 37.8, 37.15, 37.14; 220/85 H, 22; D3/30.1, 74; 211/74, 86; 312/244, 280; 248/310, 316.7

[56] References Cited
U.S. PATENT DOCUMENTS

| | | | |
|---|---|---|---|
| 2,160,282 | 5/1939 | Rehg | 224/275 X |
| 3,071,728 | 1/1963 | Grace et al. | 248/310 |
| 3,135,392 | 6/1964 | Elkins | 224/42.43 X |
| 3,357,614 | 12/1967 | Berg | 224/273 |
| 3,394,832 | 7/1968 | McAllister et al. | 248/310 |
| 3,526,314 | 9/1970 | Trammell, Jr. | 224/275 |
| 3,618,749 | 11/1971 | Vaccaro | 220/22 |
| 3,800,939 | 4/1974 | Cornelius | 224/901 X |
| 4,163,374 | 8/1979 | Moore et al. | 220/85 H X |
| 4,170,324 | 10/1979 | Stubbings | 224/42.45 R X |
| 4,254,872 | 3/1981 | Garrett | 220/22 X |
| 4,300,709 | 11/1981 | Page, Jr. | 224/42.42 X |
| 4,515,335 | 5/1985 | DeRosett | 248/310 |
| 4,643,342 | 2/1987 | Borelli, III | 224/148 X |
| 4,681,219 | 7/1987 | Kitchens | 224/275 X |
| 4,687,096 | 8/1987 | Mansur | 220/22 X |
| 4,705,169 | 11/1987 | Mastronardo | 220/22 X |

FOREIGN PATENT DOCUMENTS 0158140  9/1982  Japan ............................. 224/42.42

*Primary Examiner*—Henry J. Recla
*Assistant Examiner*—Linda J. Sholl
*Attorney, Agent, or Firm*—Owen, Wickersham & Erickson

[57] ABSTRACT

A contractor's caddy system for use in cooperation with a truck. A caddy retainer is securable to a truck floorboard area forward of the front seat at a location readily accessible to the driver. A caddy is detachably held by the retainer and comprises a box-like structure with a bottom wall, a flat top wall, and vertical walls providing a front wall, a rear wall and first and second side walls. The top wall is recessed and shaped to provide a series of vertical compartments, including some deep ones that extend down nearly to the bottom wall and some that are shallow. There may also be a set of drawers in one side wall, which lie below the shallow compartments and extend short of the deep compartments. Some compartments may be rectangular in horizontal cross-section, while others may be circular in cross-section. One round, shallow compartment may be provided with an annular shelf near its upper end. There may be also a central handle for carrying the caddy.

8 Claims, 4 Drawing Sheets

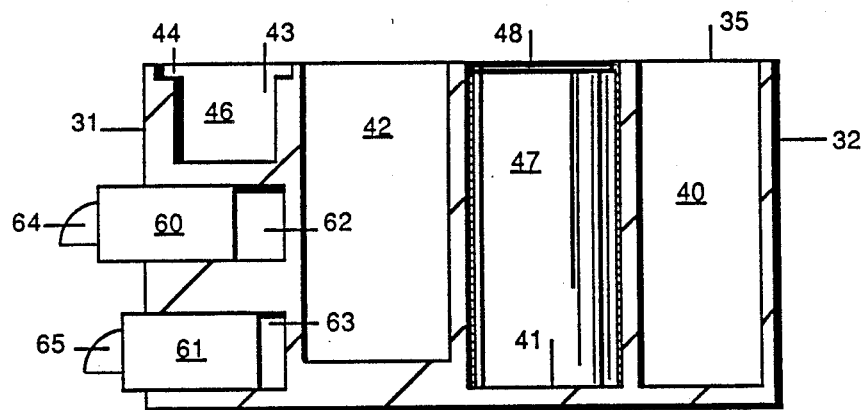
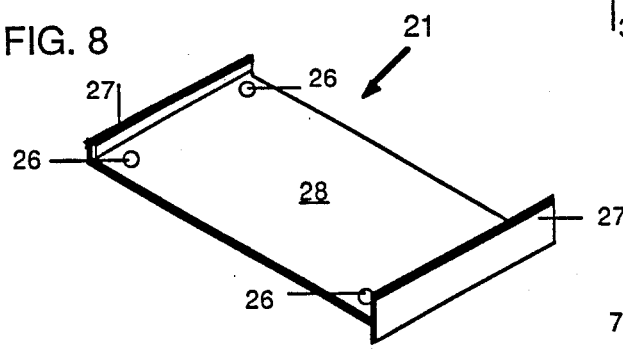
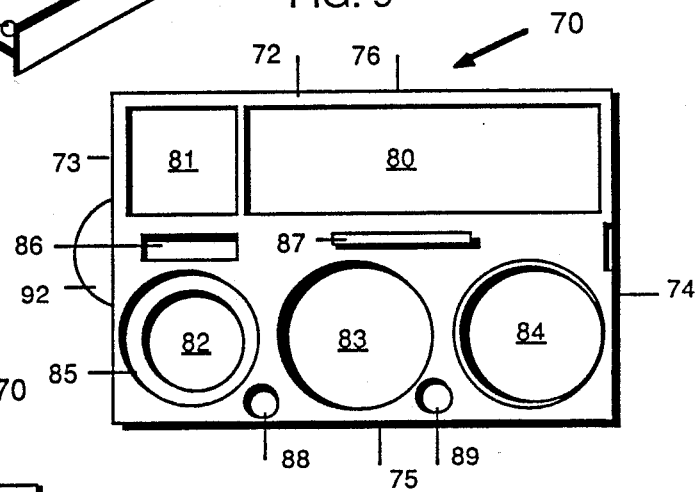
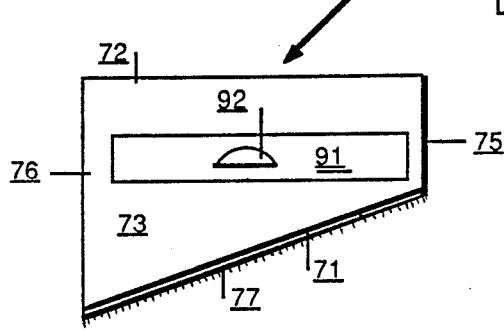

CONTRACTORS' CADDY

This invention relates to a contractors' caddy for use in trucks by such people as contractors and others who operate much of their businesses from their trucks. The caddy is used for keeping in good order the papers and other materials they use, so that they are readily accessible. The caddy can be detached from the truck and taken into an office or to a job site for discussion and then restored to the truck later.

BACKGROUND OF THE INVENTION

Contractors and many other people often have to drive a truck from one location to another and hold conversations, take measurements and notes for estimates, or direct work in accordance with plans or specifications. Just to throw material willy-nilly onto a seat in the truck is unsatisfactory, and there appears to be no fully satisfactory system available for keeping different kinds of paper, simple tools and supplies and other materials in order. In addition to the papers for the job, contractors often wish to carry some food and drink for themselves, which they either consume while driving or at a spot where they pull off the road or at the job site when they arrive. It is desirable to keep these provisions in order, too.

Moreover, it is desirable for a contractor and other such people to have a caddy of this type which is readily detachable from the truck so that it can be carried nearer the actual job site after parking, or into an office, or elsewhere for discussion or comparison with other papers. Here again, there appears to be nothing presently available which meets this need.

SUMMARY OF THE INVENTION

This invention provides a contractor's caddy system for use in cooperation with a truck. A caddy retainer, securable to the floorboard in a truck forward of the front seat at a location readily accessible to the driver, holds detachably the caddy proper. The caddy comprises a box-like structure, which generally may be shaped as a parallelepiped with a flat bottom wall, four vertical walls providing a front wall, a rear wall and first and second side walls, and a top wall. The top wall is recessed and shaped to provide a series of vertical compartments, including some deep ones that extend down substantially to the bottom wall, and adjacent one side wall, compartments that are shallow; this side wall may have a set of drawers that lie below the shallow compartments and extend in short of the deep compartments. The caddy may be molded from a suitable plastic or made from wood or sheet metal.

In one such system the compartments that lie adjacent to the front wall are rectangular in horizontal cross-section while those that lie adjacent to the rear wall are circular in cross section. Of course, the caddy can be turned around so that the front wall becomes the rear wall.

One of the round, shallow compartments may be provided with a circular shelf near its upper end, to support a drinking cup or mug, or a narrower deeper portion of that compartment can support a can holding a soft drink.

Between the round and rectangular compartments, there may be a central handle for carrying the caddy. Also, between the round and rectangular compartments there may be a series of aligned vertical receptacles that are aligned also with the handle, for holding long articles that are not wide.

The caddy may also have a tape-measure retaining clip adjacent one side wall.

Other shapes and dispositions of compartments etc., can be provided.

BRIEF DESCRIPTION OF THE DRAWINGS

FIG. 7 is a view in section taken along the line 7—7 in FIG. 2.

FIG. 8 is a view in perspective of the supporting bracket of FIG. 1, which may be secured to a truck and in which the caddy may detachable fit.

FIG. 9 is a top plan view of a modified form of caddy also embodying the principles of the invention but somewhat smaller than the device of FIGS. 1-8, for use in a somewhat smaller truck having an automatic transmission.

FIG. 10 is a view in side elevation of the caddy of FIG. 9.

DESCRIPTION OF A PREFERRED EMBODIMENT

The caddy of FIGS. 1-8

Figure 1:
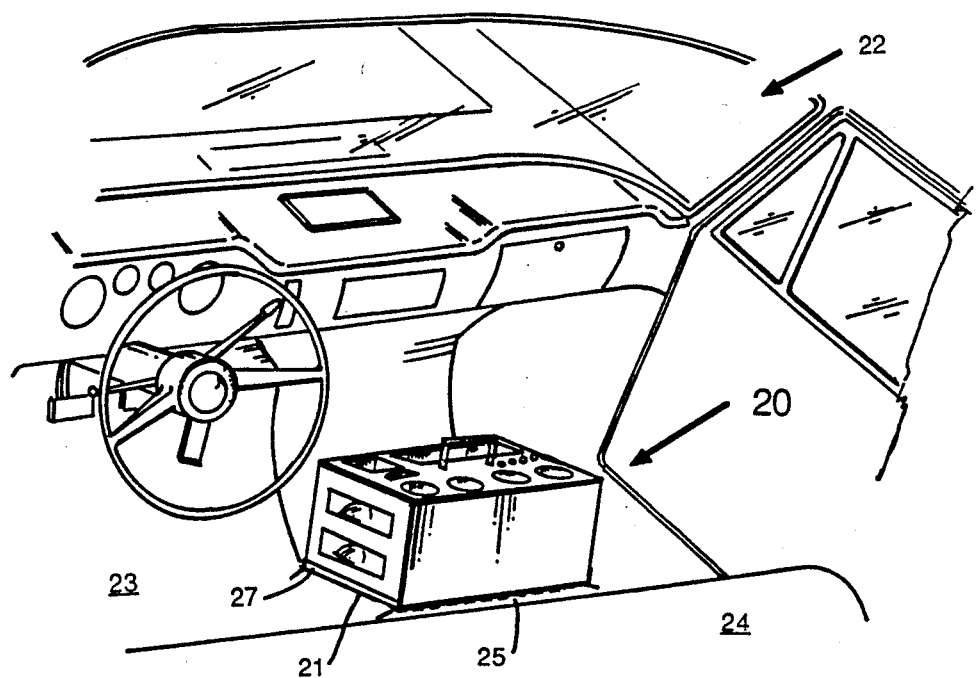
FIG. 1 is a view in perspective of a contractor's caddy embodying the principles of the invention, shown in place in a truck of the type having an automatic transmission, in front of the truck's front seat.

A first form of the invention shown in FIGS. 1-8, is best used with a truck having an automatic transmission. A contractors's caddy 20 (FIGS. 1-7) is normally held by a supporting bracket 21 (FIGS. 1 and 8) which is secured in and to a truck 22 over the floorboard area 23 lying forward of its front seat 24, there usually being an upwardly projecting portion 25 covering a duct through which the truck's transmission and other elements extend. This bracket 21 is secured relatively permanently to the truck 22, by screws 26, and it may have a pair of upturned flanges 27 at opposite ends of a base plate 28. The caddy 20 is made to fit snugly but removably in the bracket 21 between the flanges 27.

As shown in FIGS. 2-7, the caddy 20 may be a generally rectangular parallelepiped with various recesses, compartments, cavities, drawers, receptacles, and so on to hold the articles and materials needed or desired. The form illustrated is molded from a rigid plastic. With minor modifications, it can be made from sheet metal or wood.

The caddy 20 thus preferably has a flat bottom wall 30, vertical walls 31, 32, 33, and 34, and a top wall 35.

The top wall 35 is provided with a series of openings down from which a series of compartments or recesses etc. extend.

In the form of the invention shown in FIGS. 1–7, this caddy 20 includes a generally rectangular deep compartment 36 (FIGS. 1 and 4), such as may hold a clip board or two and sheets of paper, next to which is a shallow rectangular compartment 37 adjacent the wall 31, which can be used for loose change and the like.

Figure 2:
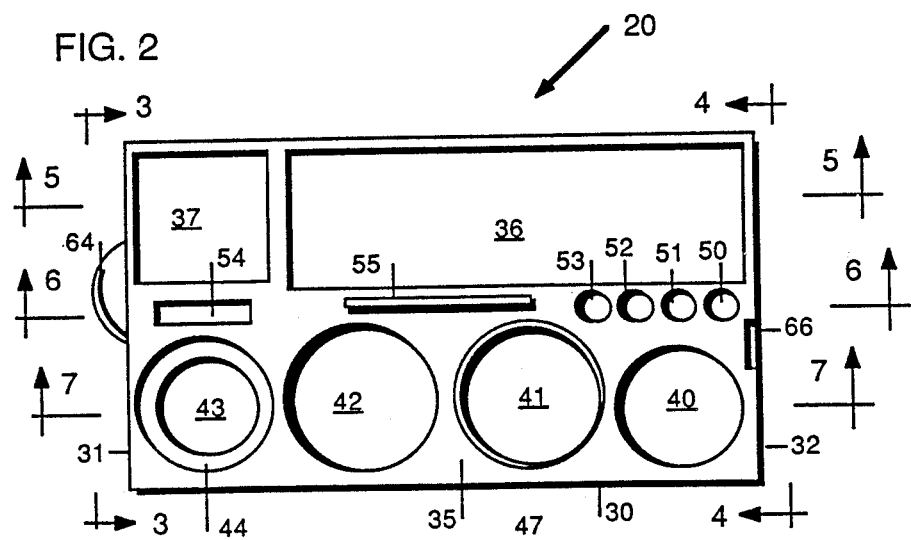
FIG. 2 is a top plan view of the caddy of FIG. 1.

Four cylindrical compartments 40, 41, 42, and 43 are shown in FIGS. 2 and 7, two compartments 40 and 41 of which are deep, extending for the full height of the caddy 20 and can be used to hold rolled drawings and other such things. The compartment 41 may have a removable cylinder 47 for drawings or trash, for example; the cylinder 47 may have a fold-over handle 48. Another compartment 42, somewhat more shallow, may also hold rolled drawings or may be used to carry a thermos bottle for a beverage or a similar article. The round compartment 43, adjacent to the side wall 31 is much shallower and can be provided with an annular shelf 44 to support a coffee cup or the like, or a cup-like top of the thermos bottle when it is used to drink from; it may also have a narrower, deeper portion 46 to hold a can or bottle of a soft drink or the like.

Figure 6:
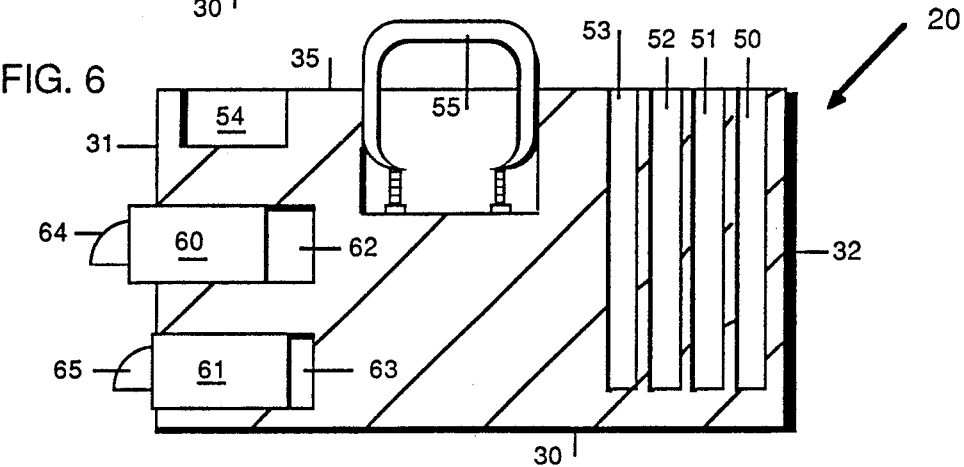
FIG. 6 is a view in section taken along the line 6—6 in FIG. 2.

Between the rectangular compartment 36 and the cylindrical compartments 40 and 41, along the centerline of the caddy 20, smaller diameter cylindrical vertical receptacles 50, 51, 52, and 53 may be provided (FIGS. 2 and 6) for pencils, pens, tools and the like. There may also be a rectangular receptacle 54 (e.g., to hold business cards) aligned with the four cylindrical receptacles 50, 51, 52, and 53 between the compartments 37 and 43. Aligned with these receptacles is a caddy-carrying handle 55. The handle 55 may ordinarily be flush with the upper surface 35 of the caddy 20, and it may be pulled upwardly, as shown in FIG. 6, where it can be grasped and used to carry the caddy 20.

Figure 3:
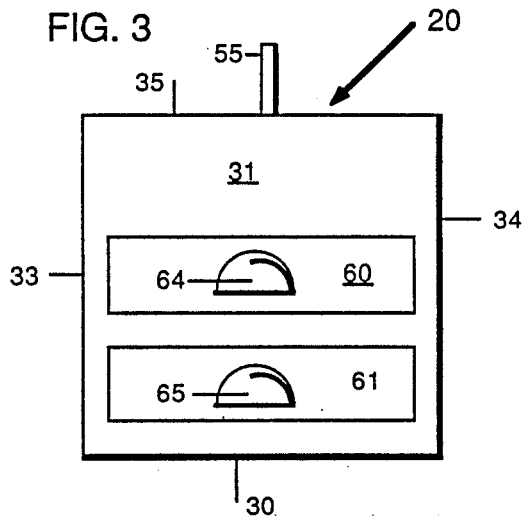
FIG. 3 is a view in elevation looking along the line 3—3 in FIG. 2.
Figure 4:
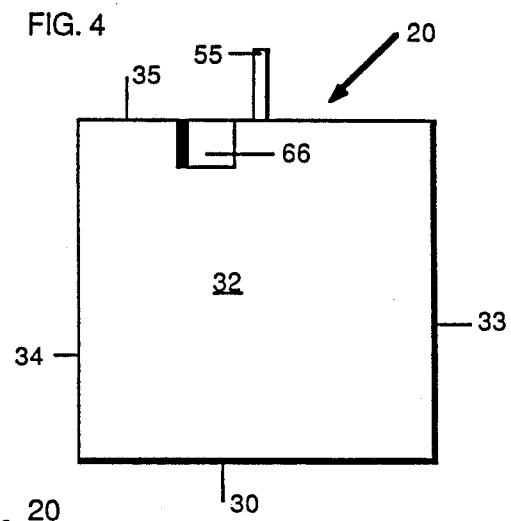
FIG. 4 is a view in elevation looking along the line 4—4 in FIG. 2.
Figure 5:
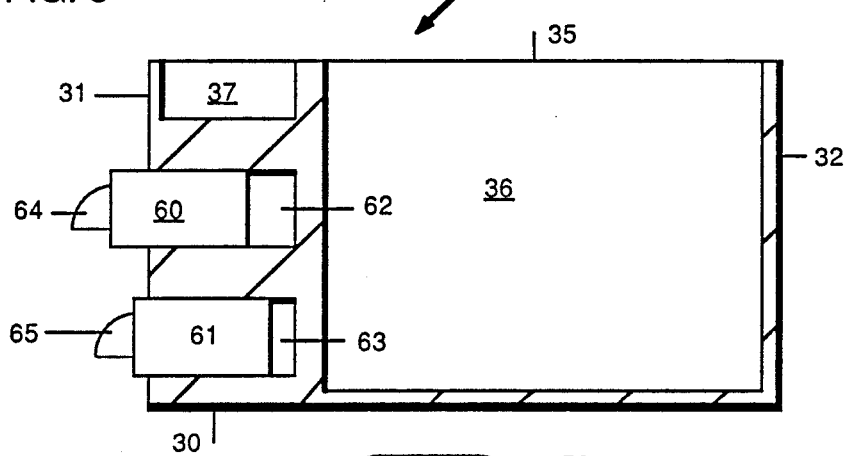
FIG. 5 is a view in section taken along the line 5—5 in FIG. 2.

A pair of sliding drawers 60 and 61 be provided in recesses 62 and 63 respectively, as best shown in FIG. 7. These drawers 60 and 61 may have pull handles 64 and 65. The cavities 62 and 63 and the drawers 60 and 61 are somewhat shallow and, as shown in FIGS. 3 and 7, lie below the bottoms of the change-holding compartment 57 and the cup and can-supporting receptacle 43. These drawers 60 and 61 may hold miscellaneous small items used by the contractor and may be opened and closed as desired.

A catch 66 (FIGS. 2 and 4) may be provided, which may engage a portion of a tape measure, to support the tape measure at the side 32 of the caddy 20.

When the caddy 20 is utilized, it accommodates and holds neatly various things in its various compartments, receptacles, drawers, etc. All of them can be arranged in good order, where the contractor or other user can quickly obtain them. He can thus keep everything he needs in order and have it readily accessible so that he can reach it right from the driver's seat, or he can carry the caddy with him, and use it somewhere else.

Moreover, by pulling the handle 55 up, he can then lift the caddy 20 out of the bracket 21 and carry it wherever he wishes, while taking along all the items it holds and retaining them in good order.

The caddy 70 of FIGS. 9 and 10

FIG. 9 illustrates one of the many possible modifications of the invention. This caddy 70 is designed for use in a smaller truck having an automatic transmission, with less space available forward of the front seat for accommodation of the caddy. The caddy 70 has an inclined flat bottom wall 71 and a flat top wall 72. There are vertical side, walls 73 and 74, a rear wall 75, and a front wall 76. A "VELCRO" (trademark) i.e., hook and pile member 77 is secured to the bottom wall 71 for coaction either with a plush-type carpet overlying the truck floorboard or with a matching "VELCRO" member secured to a rubber floorboard mat.

There are a large, deep rectangular compartment 80 for clipboards etc., and a shallow rectangular compartment 81 adjacent the front wall 76. There are three cylindrical compartments 82, 83, and 84 adjacent the rear wall 75. The compartment 82 may be shallow like the compartment 43, and have an annular shelf 85. There may be a removable cylinder like the cylinder 47. There may also be a shallow rectangular compartment 86, a handle 87, and a pair of small cylindrical receptacles and 88 and 89 for pencils and pens and a tape-holding member 90. In the side wall 73 near the driver; there may be a sliding drawer 91 with a handle 92.

Other arrangements and modifications are of course possible.

Figure 11:
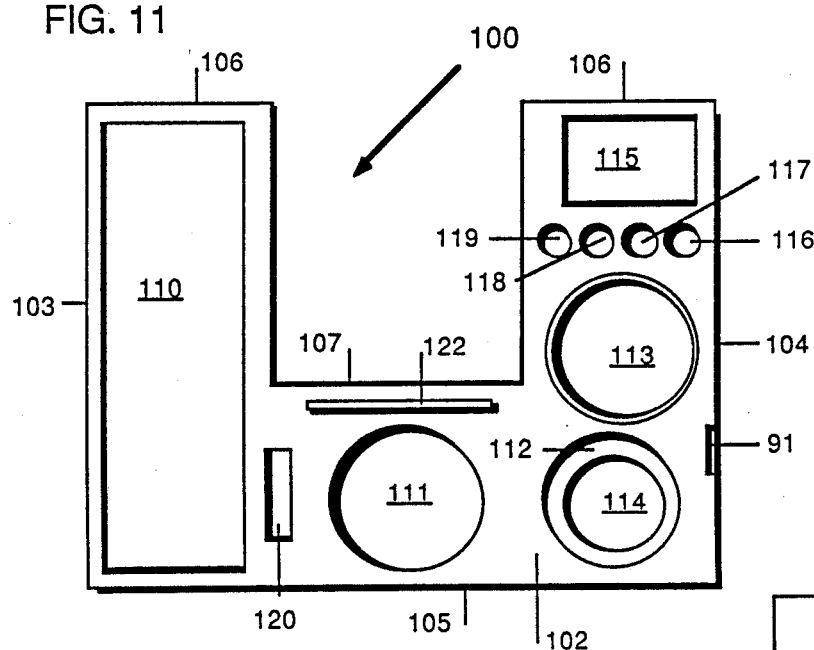
FIG. 11 is a top plan view of another modified form of caddy embodying the principles of the invention for use in a truck having a manual gearshift lever.
Figure 12:
FIG. 12 is a view in side elevation of the caddy of FIG. 11.

The caddy 100 of FIGS. 11 and 12

FIG. 11 illustrates another modified form of the invention. This caddy 100 is designed for use in a truck having a gearshift lever and fits around it, nested into an appropriate holder that is not illustrated. The caddy 100 has a sloping bottom wall 101 and a flat top wall 102. There are vertical side walls 103 and 104, a rear wall 105, and a front wall 106 with a recessed portion 107. The bottom wall 101 has a "VELCRO" i.e., a hook and pile member 108 attached thereto as in FIGS. 9 and 10, for securing the caddy 100 in the floorboard area to a matching "VELCRO" member or a pile carpet.

There is a large, deep rectangular compartment 110 for clipboards etc., and three cylindrical compartments 111, 112, and 113; the compartment 112 may be shallow like the compartment 43, and have an annular shelf 114. There may be also a shallow rectangular compartment 115, four deep cylindrical receptacles 116, 117, 118, 119, a narrow rectangular receptacle 120, and tape-holding member 121, and a carrying handle 122.

The caddy 130 of FIG. 12

Figure 13:
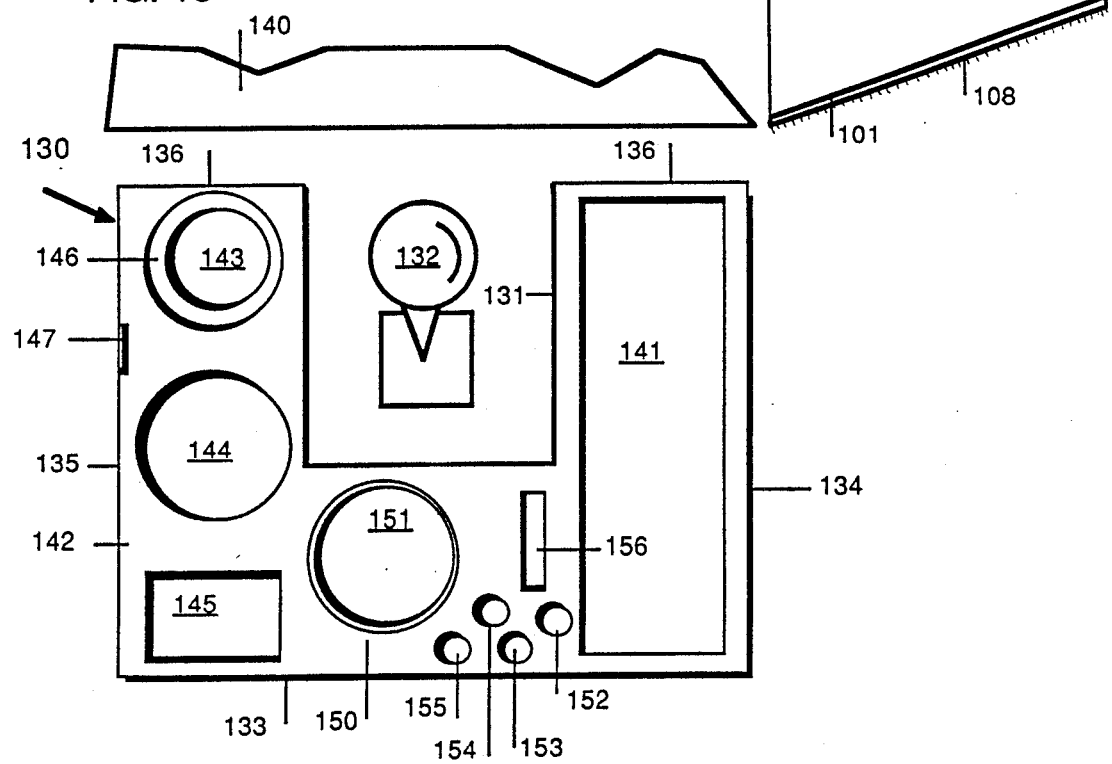
FIG. 13 is a top plan view of a further modified device, generally like that of FIG. 11 but differing somewhat.

The caddy 130 of FIG. 13 is generally like the caddy 100 and is intended to fit around a gearshift box 131 and shaft 132. Its bottom wall (not shown) may be like the bottom wall 101 of the caddy 100. It has a flat bottom wall 101 of the caddy 100. It has a flat upper wall 133, vertical side walls 134 and 135, a vertical front wall 136, and a vertical back recessed wall 137 with a recessed portion 138, opposite the seat 140 on the other side of the gearshift shaft 132.

One wing 140 of the caddy 130 accommodates a deep, large, clipboard receiving, rectangular compartment 141. Another wing 142 accommodates two cylindrical compartments 143 and 144 and a narrow rectangular compartment 145. The compartment 143 may include an annular shelf 146. The wing 142 also provides a clip 147 for the measuring tape.

One narrower connecting portion 150 of the caddy 130 has a cylindrical compartment 151. It also includes some small diameter cylindrical receptacle 152, 153, 154, and 155, and a rectangular receptacle 156. There are no drawers.

Still other arrangements and modifications are possible.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A contractor's caddy system for use in cooperation with a truck having a floorboard at a floorboard area and a front seat to the rear of and above said floorboard area, comprising:

a caddy having a box-like structure with a bottom wall, vertical walls providing front, rear, and side walls, and a flat top wall, with a handle-aligning opening parallel to said front wall and centered between said front and rear walls, and centered between said side walls, a caddy retainer comprising a base plate with first and second opposed ends, each one of said first and second opposed ends having an upwardly extending peripheral flange, said caddy being sized to fit detachably on said base plate of said caddy retainer by biasing outwardly said flanges of said caddy retainer to provide a frictional fit between said caddy and said caddy retainer, said caddy retainer having securing means for firmly securing said caddy retainer to said truck over said floorboard area, to locate said caddy forward of and lower than the front seat at a location readily accessible to the driver, said securing means holding said caddy retainer stationary with respect to said floorboard, a handle slidably secured to said box-like structure of said caddy and extending through said handle-aligning opening, said handle serving for carrying said caddy when said caddy is separated from said caddy retainer, said handle being located by said handle aligning opening to be centrally between said front and rear walls and centrally between said side walls, and parallel to said front wall, said handle sliding up and down said handle-aligning opening for freely and readily collapsing vertically down from said flat top wall into said caddy, to a position substantially flush with said flat top wall, for storage, and sliding upwardly by being pulled to a second position projecting vertically upwardly for carrying said caddy, said caddy being recessed down from said top wall and shaped to provide a series of vertical compartments and receptacles, including some deep compartments and receptacles that extend down substantially nearly to said bottom wall and some compartments and recesses that are shallow and are spaced above said bottom wall.

2. The caddy system of claim 1 wherein said caddy retainer's securing means comprise screws.

3. The caddy system of claim 1 having storage means providing an opening through one side wall and a chamber adjoining said opening and extending below said shallow compartments but short of the deep compartments, to provide a storage compartment.

4. The caddy system of claim 3 wherein said storage compartment includes a set of drawers that slide into and out from said chamber via said opening.

5. The caddy system of claim 1 in which the vertical compartments that lie adjacent to said front wall are rectangular in horizontal cross-section while those that lie adjacent to said rear wall are circular in horizontal cross-section.

6. The caddy system of claim 5 wherein there is a cylindrical container inside and freely removable from one of said circular compartments, enabling the collection of trash and the removal of said container for disposal of said trash.

7. The caddy system of claim 5 wherein a round, shallow said vertical compartment is cylindrical with an inner peripheral wall, and is provided with a downwardly recessed annular shelf on its said inner peripheral wall below and near to its upper end, for supporting and retaining in place a drinking vessel.

8. The caddy system of claim 5 wherein between said round and rectangular compartments there is a series of aligned vertical receptacles deeper than said shallow compartments, aligned with said handle, for holding long articles that are not wide.

* * * * *